United States Patent [19]
Giolitti et al.

[11] 4,016,602
[45] Apr. 5, 1977

[54] CARTRIDGE FOR ENDLESS MAGNETIC-TAPE LOOP AND DEVICE FOR RECORDING AND/OR READING THEREOF

[75] Inventors: Nicolo Giolitti, Ivrea (Turin); Michele Bovio, Banchette (Turin), both of Italy

[73] Assignee: Ing. C. Olivetti & C., S.p.A., Ivrea (Turin), Italy

[22] Filed: July 8, 1975

[21] Appl. No.: 594,156

[30] Foreign Application Priority Data

July 15, 1974  Italy .................................. 69243/74

[52] U.S. Cl. .................. 360/132; 242/55.19 A
[51] Int. Cl.² .................. G11B 23/06; B65H 17/48
[58] Field of Search .............. 360/132; 242/55.01, 242/55.17, 55.18, 55.19 A

[56] References Cited

UNITED STATES PATENTS 3,106,355  10/1963  Warren .......................... 242/55.01

*Primary Examiner*—Robert S. Tupper
*Attorney, Agent, or Firm*—I. J. Schaefer

[57] ABSTRACT

A cartridge for endless magnetic tape loops including a cover containing a pair of supports substantially coplanar with the other and between which is wound a magnetic tape in lengthening coils. A third support guides a connecting coil which connects the innermost coil with the outermost coil of the loop. The third support is substantially coplanar with the pair of supports in such a way that the connecting coil is substantially coplanar with the other coils of the tape recording and/or reading device for a magnetic tape contained in a cartridge which includes at least one window through which the tape contained therein may be reached. The device includes a capstan, a pressure roller and a magnetic recording and/or reading head mounted on an activation lever. A spring element normally holds this lever against the action of a pressure spring. The insertion of the said cartridge removes the spring element so as to free the said activation lever and leave it in a working position in which the pressure roller and magnetic head are brought into contact with the tape.

2 Claims, 5 Drawing Figures

CARTRIDGE FOR ENDLESS MAGNETIC-TAPE LOOP AND DEVICE FOR RECORDING AND/OR READING THEREOF

BACKGROUND OF THE INVENTION

The present invention relates to an endless magnetic tape loop and a device for recording and/or reading the tape contained in it.

A cartridge is known in which an endless loop of magnetic tape is wound onto two rewind rollers which are coplanar and mounted on a single support plate. In this cartridge a coil of tape which connects an internal coil with an external coil of tape by means of a loop, is taken from the group of coils and wound onto a pair of guide rollers. The rollers which revolve, are mounted on the same support plate as the cartridge, and have their axes of rotation lying on a plane parallel to that on which the two rewind rollers are placed.

In this cartridge, in order to pass from the innermost to the outermost coil to cross the group of coils and wind itself onto the guide rollers, the magnetic tape must be rotated at an angle of 90° with respect to itself. Thus, while crossing the group of coils, the tape rubs one of its surfaces against the edges of the coils beneath it in such a way that it is subject to considerable wear and tear. Moreover, since the guide rollers are placed on a plane parallel to that of the rewind rollers, the overall dimensions of the cartridge is notably larger than those of the tape coil group.

SUMMARY OF THE INVENTION

The main object of the present invention is to provide a cartridge for magnetic tape whose overall dimensions are substantially equal to that of the tape coil group, and in which all inter-coil friction is reduced to a minimum.

Another object is to provide a compact read/record device of simple construction for use with a magnetic tape cartridge. According to the invention, the cartridge includes a cover which carries a pair of supports which are substantially coplanar and between which the tape is wound in lengthening coils, and in which a third support guides a connecting coil. This connects the innermost coil with the outermost coil of the loop. The third support is substantially coplanar with the pair of supports so that the connection coil is largely co-planar with the other coils of the tape.

The recording and/or reading device for a magnetic tape contained in a cartridge features at least one window through which the tape contained therein may be reached. The device includes a capstan, a pressure roller and a magnetic recording and/or reading head mounted on an activation lever. A spring element which normally holds this lever against the action of a pressure spring and the insertion of the cartridge removes the spring element so as to free the activation lever and leave it in a working position in which the pressure roller and magnetic head are brought into contact with the tape.

Having in mind the above and other objects that will be obvious from an understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawings.

DESCRIPTION OF THE PREFERRED EMBODIMENT

Figure 1:
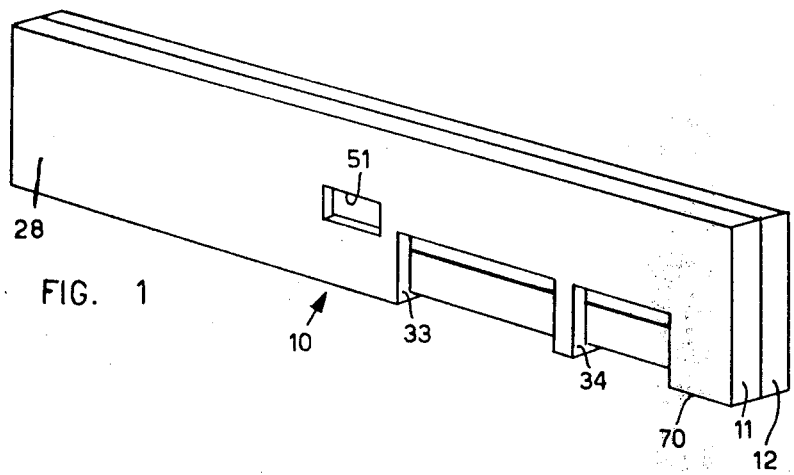
FIG. 1 is a perspective view of a cartridge according to the invention.

As shown in FIG. 1, the cartridge as presented includes an external cover 10, parallelepiped in shape, and comprising two half-shells 11 and 12, preferably made of plastic material, joined together in whichever way preferred, e.g. by soldering along their internal edges. The dimensions of the cover 10 are greatly reduced: e.g. it is 64 mm. long, 15 mm. high and 6 mm. thick.

Figure 2:
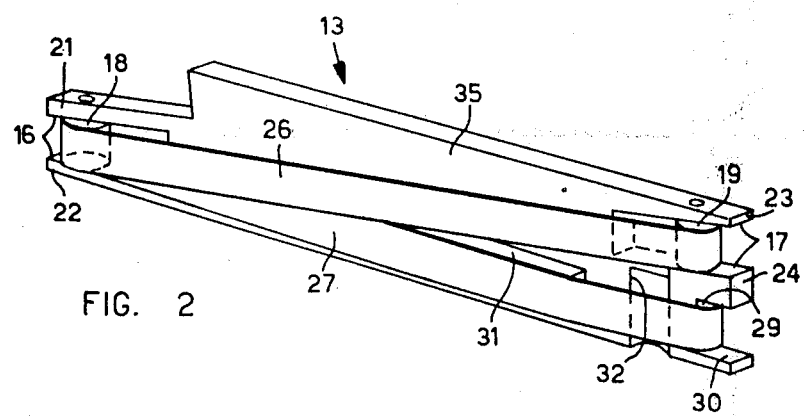
FIG. 2 is a perspective view of a detail of FIG. 1.

Inside the cover 10 there is a parallelepiped plate 13, shown in FIG. 2, also preferably made of plastic, which has two cavities 16 and 17 diagonally opposed to each other and in each of which is lodged a roller 18 and 19, respectively. The rollers 18 and 19 are rotatably mounted on the appendages 21, 22 and 23, 24 respectively of the plate 13, and have their axes of rotation parallel to each other and lying in a single vertical plane. The appendages 23 and 24 define the smaller side of the plate 13.

In particular, the roller 18 (FIG. 3) has a lower part 60 which is substantially cylindrical and an upper part 61 which is substantially frusto-conical. Moreover, the axis of rotation of the roller 18 is inclined with respect to the smaller side of the plate 13.

Figure 3:
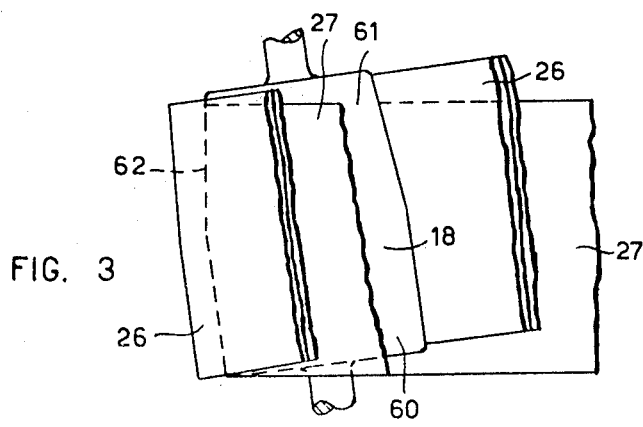
FIG. 3 is an enlarged detail of FIG. 2.

The endless magnetic tape loop 26 is wound between the rollers 18 and 19, in lengthening coils. This magnetic tape 26, whch is about 1.5 meters long, is of a known type and may have one or more recording tracks (FIGS. 2 and 3).

In order to connect the innermost coil to the outermost of the coil group, a connection coil 27 is wound between the roller 18 and a guide 29 parallel to the smaller side of the plate 13, and located inside a cavity 30 of the plate itself. Lastly the corner aperture of the frusto-conical part 61 is such that a generatrix 62 of this last coil is substantially parallel to the roller 19 and parallel to the shorter side of the plate 13.

In order to wind the magnetic tape 26 onto the guide rollers 18 and 19 and onto the guide 29 to form a loop, one end of the tape 26 is fixed provisionally (for example with adhesive tape) onto a front face 35 of the plate 13, at a point between the roller 18 and the guide 29. The tape 26 is then wound first onto the roller 18, and then in lengthening coils between the latter and the roller 19. The tape 26 is then passed between the roller 18 and the guide 29, behind the plate 13, thus completing the connection coil 27. The tape end temporarily fixed to the face 35 is then freed, and the two ends of tape 26 are joined using any known method.

Figure 4:
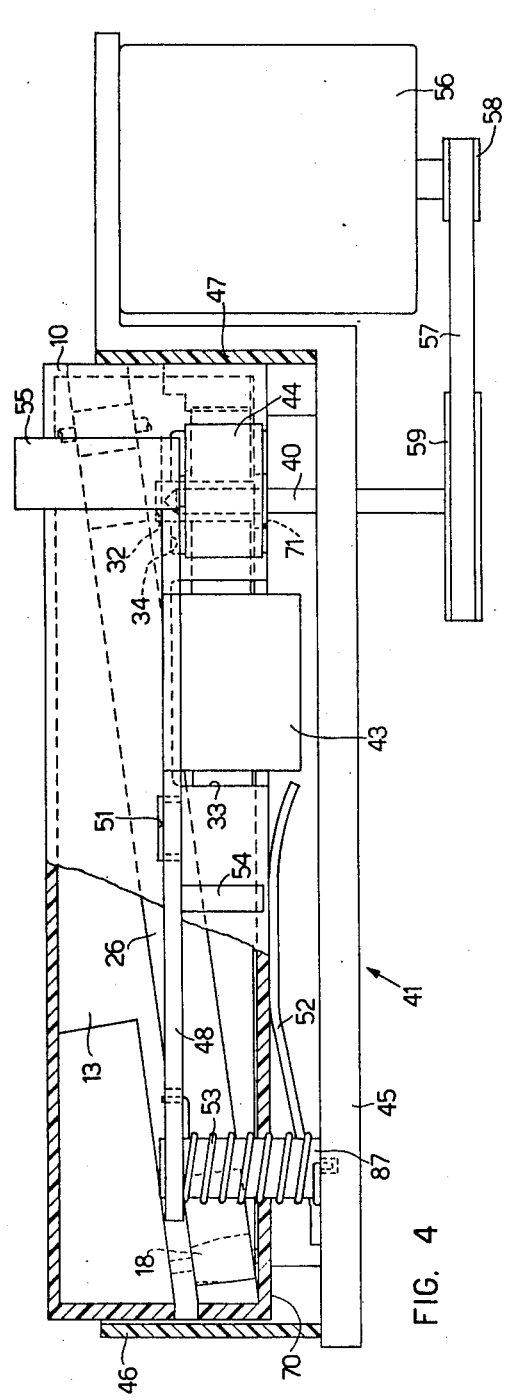
FIG. 4 is a lateral view, partially in section of the record and/or read device, according to the invention.

An elastic counteracting element 31 preferably made of spongy rubber material, is situated on the plate 13, in correspondence with the connection coil 27. This element is constantly in contact with the inner non-magnetized face of the tape 26. Moreover, also in correspondence with coil 27, plate 13 features a recess 32 able to house a capstan 40 of a device 41 (FIG. 4) for the recording and/or reading of the magnetic tape 26 contained in the cartridge 10. Two apertures 33 and 34 respectively are located on a face 28 of the half-shell (FIG. 1), in correspondence with the element 31 and the recess 32. The tape 26 may be contacted across these apertures by a recording and/or reading head 43 (FIG. 4) and by a pressure roller 44 respectively. There is also a hole 71 on the bottom 70 of the cartridge 10, across which the capstan 40 may enter the recess 32.

The recording and/or reading device includes a frame 45 (FIGS. 4 and 5) on which are mounted two guides 46 and 47, substantially parallel one to the other and between which the capstan 40 is rotatably mounted and where the cartridge 10 may be housed.

Fixed to the frame 45, between the guides 46 and 47, is a leaf spring 52 which is able to cooperate with the bottom 70 of the cartridge 10. A lever 48 is mounted on a pivot 87 on the frame 45 and onto which the head 43 is fixed. The rotatable pressure roller 44 is mounted at one end 49 of the lever. The lever 48 has a tooth 50 at the side which cooperates with a corresponding window 51 on the front face 28 of the cartridge 10 (see also FIG. 1), and, lower down, is equipped with a pin 54. A torsion spring 53, wound onto the pivot 87, has one end fixed to the lever 48 and tends to urge the lever 48 to turn in a counter-clockwise direction by pushing the pin 54 against one edge of the leaf spring 52.

Lastly, in correspondence with the pressure roller, the lever 48 is equipped with a lug 55 which is bent upwards.

An electric motor 56 is fixed onto the frame 41, and transmits motion to the roller 40 by means of a driving belt 57, stretched between a pulley 58 of the motor 56 and a pulley 59 keyed onto the roller 40.

In a rest position, the lever 48 holds the recording head 43 and the pressure roller 44 away from the space between the guides 46 and 47 due to the fact that in this position the torsion spring 53 pushes the pin 54 of the lever 48 against the leaf spring 52 which is in a raised position.

To record and/or read the magnetic tape 26 contained in a cartridge 10, the latter is inserted between the guides 46 and 47 of the device 41, with the face 28 turned towards the head 40.

Thus the cartridge rests on the leaf spring 52 and the capstan 40 enters the hole 71 of the cartridge 10 and is lodged in the recess 32 of the plate 13. In order to assure the correct insertion of the cartridge 10, it has a bevel 72 on one corner which corresponds to a ply in the guide 47.

By continuing to press the cartridge 10 downwards, the reaction of the spring 52 is overcome, it buckles, and in doing so, it frees the pin 54 from the lever 48. Because of the action of the torsion spring 53, the lever 48 (FIG. 5) then turns in a counter-clockwise direction and carries the head 43 inside the aperture 33, the pressure roller inside the aperture 34, and the tooth 50 inside the window 51. In this way the head 43 and the pressure roller 44 are brought into contact with the tape 26, while the tooth 50 locks the cartridge 10 into the position it has thus reached.

Figure 5:
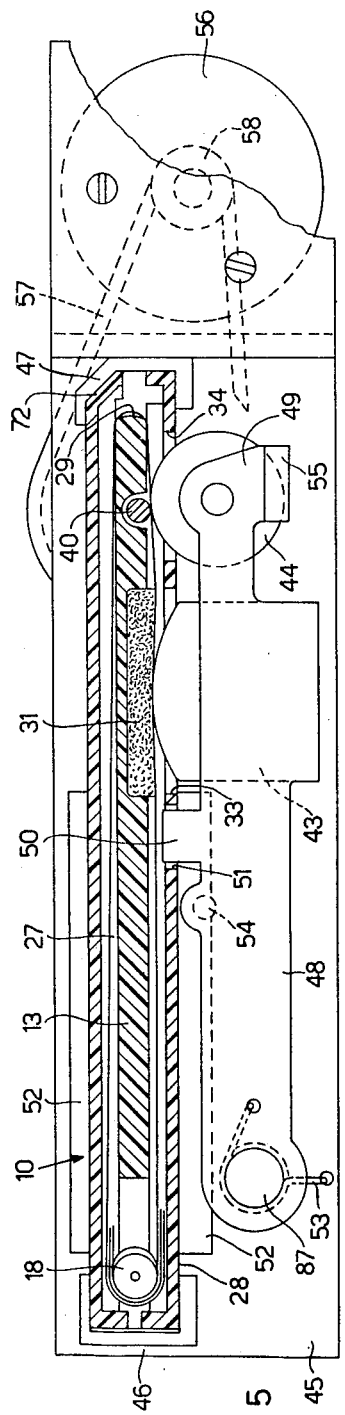
FIG. 5 is a plan view, partially in section, of the device of FIG. 4.

By accelerating the electric motor 50, using the pulleys 58 and 59 and the driving belt 57, the capstan 40 is rotated in a counter-clockwise direction (FIG. 5).

Consequently, pressed by the pressure roller 44 against the capstan 40 by the action of the torsion spring 53, the magnetic tape is pulled across the head 43. The head 43 can thus record and/or read the tape 26 contained in the cartridge 10.

In order to extract the cartridge 10 from the device 41, on completion of the recording and/or reading, after having stopped the motor 50, the head 43, the roller 44 and the tooth 50 are removed from the cartridge 10 by causing the lever 48 to turn in a clockwise direction (FIG. 5) by manual action applied to the lug 55 of the lever 48, against the action of the spring 53.

The clockwise rotation of the lever 48 causes the pin 54 to be removed from the edge of the leaf spring 52. The latter then gives the cartridge a slight impulse upwards, thus permitting the said cartridge to be extracted from the guides 46 and 47. Leaving the lever 48, the pin 54 returns against the edge of the leaf spring 52, now in a raised position, thus re-establishing the initial rest conditions previously described.

The recording and/or reading device hitherto described, is very small in size, for example 9 cm long and 2 cm wide. Because of this and its operational simplicity, this device and its tape cartridges can be used as data storage units in place of the already known magnetic cards and their corresponding readers in small calculating or accounting units.

While preferred embodiments of the invention have been shown by way of example in the drawings, it will be understood that the invention is in no way limited to these embodiments.

What is claimed is:

1. A small dimension cartridge for an endless tape loop for use in a small calculating or accounting unit or the like, comprising:
    a. a container;
    b. a substantially parallelepiped plate mounted inside said container and including first and a second short sides and first and a second long sides longer than said short sides;
    c. first and second guide means mounted on said plate at said first short side and having the longitudinal axes thereof lying in a plane substantially parallel to said short sides;
    d. third guide means mounted on said plate at said second short side and having the longitudinal axis thereof lying in a plane substantially parallel to said short sides, wherein said first and third guide means define therebetween a first tape path disposed substantially diagonally with respect to said plate around which a plurality of lengthening tape coils are wound and wherein said second and said third guide means define therebetween a second tape path substantially parallel to said long sides and around which a connecting coil of said tape is wound connecting the innermost coil with the outermost coil of said first tape path; and
    e. at least one access aperture in said container in correspondence with said second tape path and across which the tape is accessible to effect the driving, recording and/or reading thereof.

2. A small dimension cartridge according to claim 1, wherein said third guide means comprises a roller having a cylindrical lower portion and a frusto-conical upper portion having the generatrix thereof parallel to said short sides.

* * * * *